United States Patent
Wan et al.

(10) Patent No.: US 9,002,646 B1
(45) Date of Patent: Apr. 7, 2015

(54) NAVIGATION SYSTEM WITH CONNECTION SIMPLIFICATION MECHANISM AND METHOD OF OPERATION THEREOF

(71) Applicant: Telenav, Inc., Sunnyvale, CA (US)

(72) Inventors: Feng Wan, Mountain View, CA (US); Xun Liu, Shanghai (CN)

(73) Assignee: Telenav, Inc., Sunnyvale, CA (US)

( * ) Notice: Subject to any disclaimer, the term of this patent is extended or adjusted under 35 U.S.C. 154(b) by 0 days.

(21) Appl. No.: 14/181,213

(22) Filed: Feb. 14, 2014

(51) Int. Cl.
*G01C 21/34* (2006.01)

(52) U.S. Cl.
CPC ...................................... *G01C 21/34* (2013.01)

(58) Field of Classification Search
CPC ............................ G01C 21/34; G01C 21/3446
USPC ................... 701/533, 411, 428, 409
See application file for complete search history.

(56) References Cited

U.S. PATENT DOCUMENTS

| 6,298,296 B1 | 10/2001 | Takahashi |
| 2005/0004753 A1 | 1/2005 | Weiland et al. |
| 2010/0094542 A1 | 4/2010 | Kang |
| 2013/0282263 A1 * | 10/2013 | Tee ............................... 701/118 |

* cited by examiner

*Primary Examiner* — Thomas G Black
*Assistant Examiner* — Luke Huynh
(74) *Attorney, Agent, or Firm* — IP Investment Law Group

(57) ABSTRACT

A method of operation of a navigation system includes: generating a junction node having a junction decision point; identifying an internal segment within the junction node, the internal segment connected to the junction decision point; identifying an external segment outside of the junction node, the external segment connected to the internal segment at the junction decision point; generating a traffic path through the junction node based on eliminating the junction decision point for merging the internal segment and the external segment; updating the junction node based on eliminating the traffic path in violation of a turn restriction; and generating a preferred path with a control unit through the junction node updated for displaying on a device.

20 Claims, 6 Drawing Sheets

US 9,002,646 B1

NAVIGATION SYSTEM WITH CONNECTION SIMPLIFICATION MECHANISM AND METHOD OF OPERATION THEREOF

TECHNICAL FIELD

The present invention relates generally to a navigation system, and more particularly to a system for connection simplification mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system without a connection simplification mechanism has become a paramount concern for the consumer. The inability decreases the benefit of using the tool.

Thus, a need still remains for a navigation system with connection simplification mechanism. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: generating a junction node having a junction decision point; identifying an internal segment within the junction node, the internal segment connected to the junction decision point; identifying an external segment outside of the junction node, the external segment connected to the internal segment at the junction decision point; generating a traffic path through the junction node based on eliminating the junction decision point for merging the internal segment and the external segment; updating the junction node based on eliminating the traffic path in violation of a turn restriction; and generating a preferred path with a control unit through the junction node updated for displaying on a device.

The present invention provides a navigation system, including: a control unit for: generating a junction node having a junction decision point, identifying an internal segment within the junction node, the internal segment connected to the junction decision point, identifying an external segment outside of the junction node, the external segment connected to the internal segment at the junction decision point, generating a traffic path through the junction node based on eliminating the junction decision point for merging the internal segment and the external segment, updating the junction node based on eliminating the traffic path in violation of a turn restriction, generating a preferred path through the junction node updated, and a communication interface, coupled to the control unit, for communicating the preferred path for displaying on a device.

The present invention provides a navigation system having a non-transitory computer readable medium including instructions for execution, the instructions comprising: generating a junction node having a junction decision point; identifying an internal segment within the junction node, the internal segment connected to the junction decision point; identifying an external segment outside of the junction node, the external segment connected to the internal segment at the junction decision point; generating a traffic path through the junction node based on eliminating the junction decision point for merging the internal segment and the external segment; updating the junction node based on eliminating the traffic path in violation of a turn restriction; and generating a preferred path through the junction node updated for displaying on a device.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
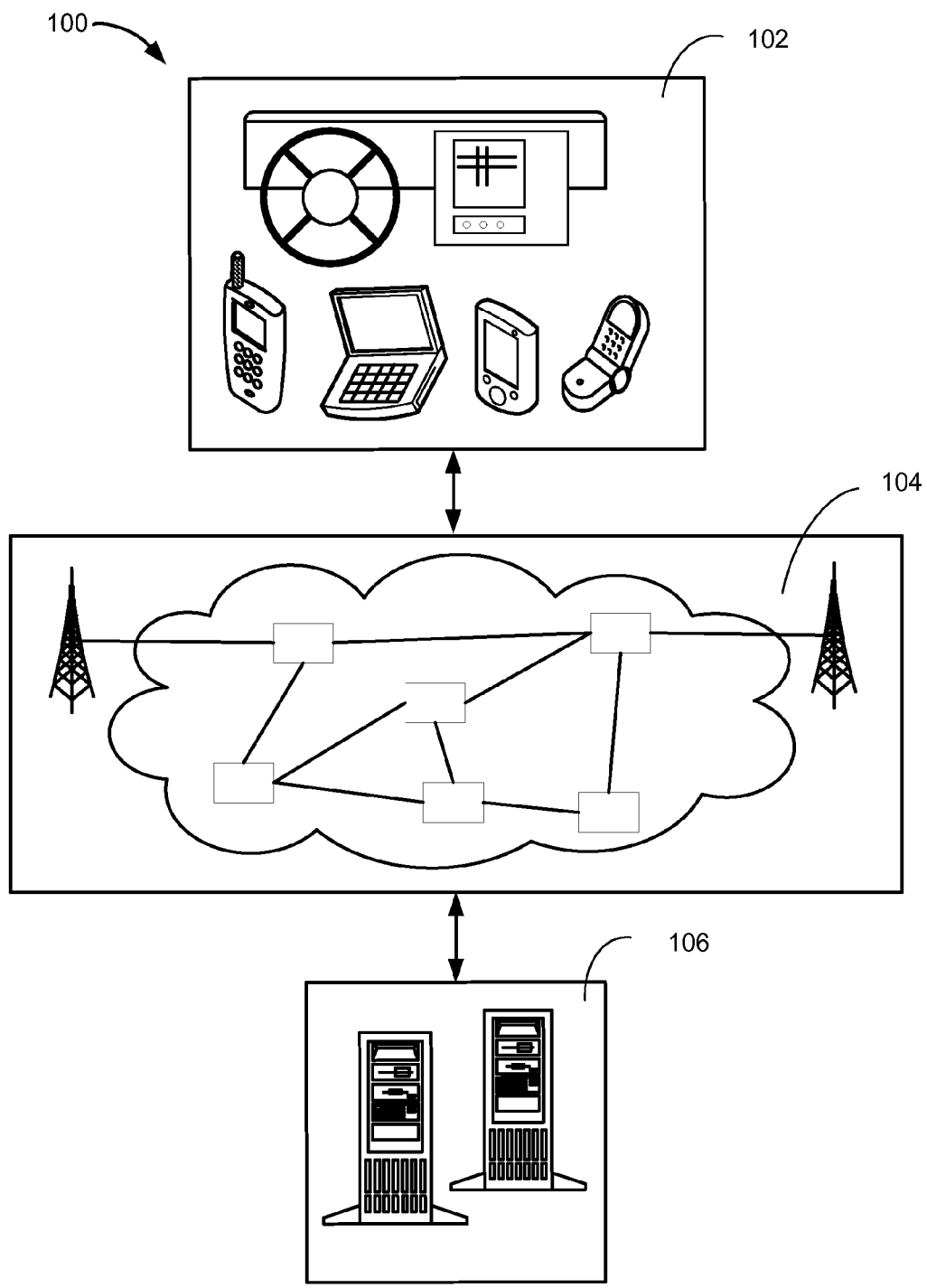
FIG. 1 is a navigation system with connection simplification mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof. The term "junction" is defined to be a geographic location where two or more roads meet or converge.

Referring now to FIG. 1, therein is shown a navigation system 100 with connection simplificationmechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
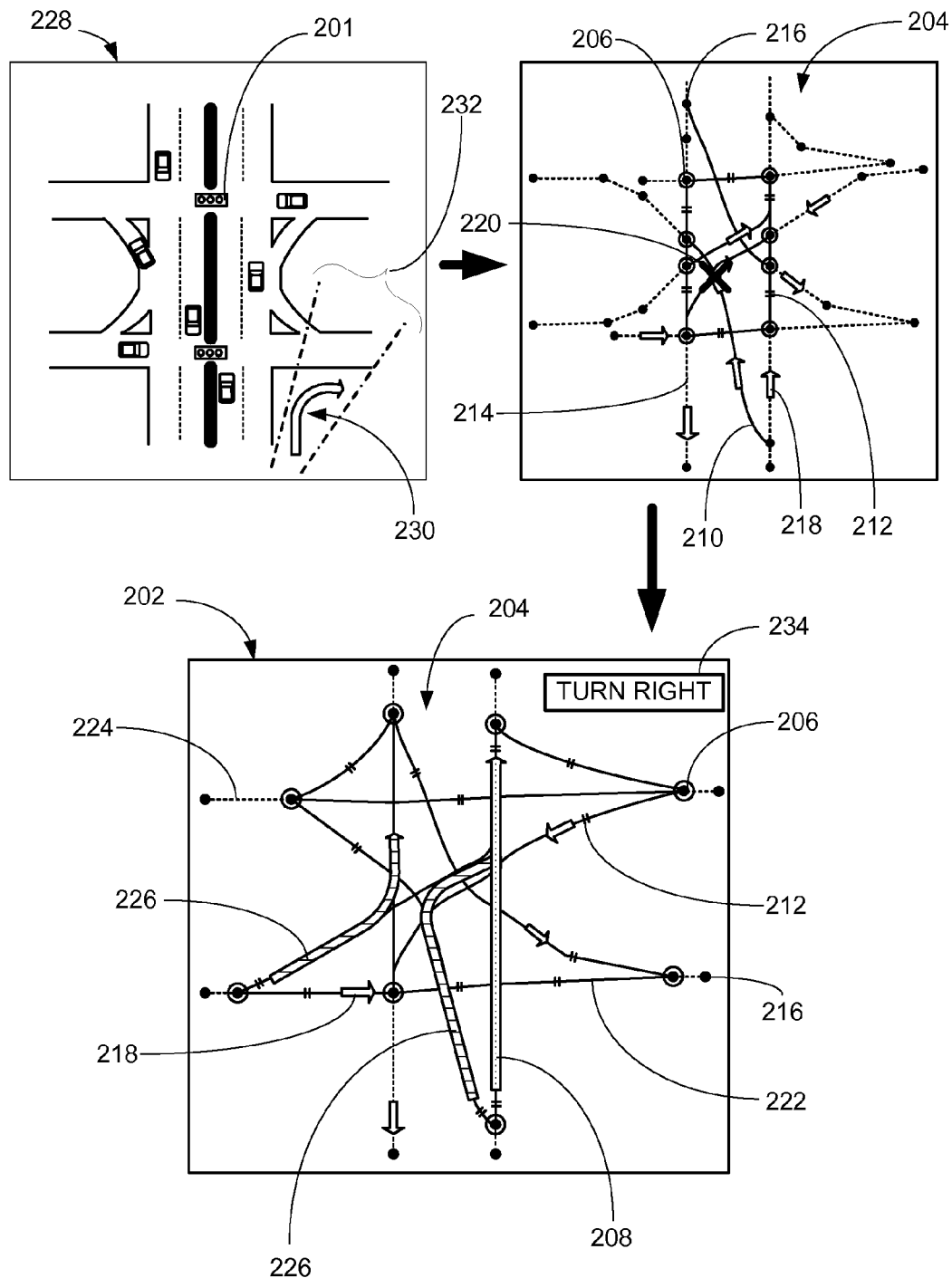
FIG. 2 is an example of converting map information into a digitized format to be displayed on a display interface of the first device.

Referring now to FIG. 2, therein is shown an example of converting map information into a digitized format to be displayed on a display interface 202 of the first device 102 of FIG. 1. For simplicity going forward, the discussion of the present invention will focus on the first device 102 displaying the result generated by the navigation system 100. However, the second device 106 of FIG. 1 and the first device 102 can be discussed interchangeably.

For example, the map information can be digitized for each direction of traffic for each lane in a road. An illustration of a conversion of the map information into the digitized format can start from a figure on a top left hand side of FIG. 2, moving on to the figure on a top right hand side of FIG. 2, and ending at the figure on the bottom side of FIG. 2. A direction of a process flow for converting the map information into the digitized format can be illustrated with an arrow. The first figure on the top left hand side can illustrate the map information prior to conversion into the digitized format. A traffic controller 201 is defined as a mechanism placed by the government to control the flow of traffic. For example, the traffic controller 201 can include a stop light, a stop sign, a road sign, or high-occupancy vehicle (HOV) lane entry point.

The second figure of FIG. 2 on the top right hand can illustrate the map information after converting the map information into the digitized format. For example, the navigation system 100 can convert the map information of an intersection of a plurality of the road into the digitized format to generate a junction node 204. The junction node 204 is defined as the digitized format of a junction having a plurality of an intersection from a plurality of the road intersecting each other. For specific example, the junction node 204 can represent a road intersection.

The junction node 204 can include junction decision points 206, which are defined as geographic locations within or at the junction node 204 where the navigation system 100 can make decisions on how to proceed with a travel. For example, the junction decision points 206 can be illustrated with a white circle surrounding a black circle. For another example, the display interface 202 can display the digitized representation of the junction decision points 206.

For specific example, at the road intersection, the navigation system 100 can decide whether to turn right, turn left, or proceed forward. The junction decision points 206 can represent the geographic location at the road intersection where the navigation system 100 can decide on how to proceed with the travel.

The junction node 204 can include an internal segment 210, which is defined as a section of the road that travels through the junction node 204, the section of the road that establishes a junction boundary 212, or a combination thereof. For example, the internal segment 210 can be illustrated with solid lines. For further example, a plurality of the internal segment 210 can be connected to each other at one of the junction decision points 206.

The junction boundary 212 is defined as an outer limit that establishes a perimeter of the junction node 204. For example, the junction boundary 212 can be established by connecting a plurality of the internal segment 210 between the junction decision points 206 that do not run through the junction node 204. For further example, the junction boundary 212 can be represented by the plurality of the internal segment 210 having parallel double lines crossing the internal segment 210. More specifically, the plurality of the internal segment 210 having the parallel double lines can represent the perimeter that establishes the junction boundary 212.

The internal segment 210 can be connected to an external segment 214 at one of the junction decision points 206. The external segment 214 is defined as a section of the road that is outside of the junction node 204, which does not travel through the junction node 204. For example, the external segment 214 can be illustrated with dotted lines. For further example, the external segment 214 can connect to one of exterior decision points 216, which are defined as the geographic locations outside of the junction node 204 where the navigation system 100 can make decisions on to how to proceed with a travel. For example, the exterior decision points 216 can be illustrated with a black circle. For specific examples, a plurality of the external segment 214 can be connected to each other at one of the exterior decision points 216.

The display interface 202 can display a traffic direction 218, which is defined as a direction of traffic flow for traveling along the internal segment 210 or the external segment 214. The examples of the traffic direction 218 going forward are based on the direction of traffic flow in the United States. The junction node 204 can include a turn restriction 220, which is defined as a limitation on how to proceed with the travel at the junction decision points 206, the exterior decision points 216, or a combination thereof. For example, the turn restriction 220 can include a "no right turn." For another example, the turn restriction 220 can include disallowing a turn that goes against the traffic direction 218.

The third figure of FIG. 2 on the bottom can illustrate the junction node 204 that has been updated after the internal segment 210 and the external segment 214 have been merged. For example, the navigation system 100 can merge the internal segment 210 and the external segment 214 to generate a traffic path 222 for traveling through the junction node 204. The traffic path 222 is defined as a candidate route generated based on merging the internal segment 210, the external segment 214, or a combination thereof for traveling through the junction node 204.

For example, the navigation system 100 can generate a plurality of the traffic path 222 as the candidate route to provide options for the user of the first device 102 to travel through the junction node 204. For another example, the traffic path 222 can be generated based on merging of the plurality of the internal segment 210. For different example, the traffic path 222 can be generated based on merging of the plurality of the internal segment 210 and the plurality of the external segment 214. Details regarding the generation of the traffic path 222 will be discussed later.

The navigation system 100 can update the junction node 204. For example, the junction node 204 can be updated based eliminating the junction decision points 206. For specific example, the junction decision points 206 can be eliminated based on merging the internal segment 210 and the external segment 214. For another example, the junction decision points 206 can be eliminated based on merging the plurality of the internal segment 210 and the plurality of the external segment 214.

For different example, the navigation system 100 can update the junction node 204 by updating the junction boundary 212. For example, the junction boundary 212 can be expanded based on merging the internal segment 210 and the external segment 214. As discussed above, the traffic path 222 can be generated based on merging the internal segment 210 and the external segment 214. For further example, the junction boundary 212 that is updated can be represented by the plurality of the traffic path 222 having the parallel double lines crossing the traffic path 222. More specifically, the plurality of the traffic path 222 having the parallel double lines can represent the perimeter that establishes the junction boundary 212 that is updated.

The junction decision points 206 can be updated to endpoints of the traffic path 222. For further example, the exterior decision points 216 can be updated by converting into the junction decision points 206 based on the generation of the traffic path 222, as the exterior decision points 216 are no longer the end points of the external segment 214.

A peripheral segment 224 is defined as a section of the road connected to the traffic path 222 at the junction decision points 206 that have been updated. For example, the peripheral segment 224 can connect to one of the junction decision points 206 that have been updated and can also connect to one of the exterior decision points 216 that was not converted into the junction decision points 206.

The navigation system 100 can generate a preferred path 208 for traveling through the junction node 204 based on considering the junction decision points 206. The preferred path 208 is defined as the traffic path 222 for traveling through the junction node 204. For example, the preferred path 208 can be presented on the display interface 202 for the user of the first device 102 to travel through the junction node 204.

An invalid path 226 is defined as the traffic path 222 that is not the preferred path 208, violates the turn restriction 220, or a combination thereof. For example, the invalid path 226 can include the traffic path 222 that can direct the user of the first device 102 against the traffic direction 218. For another example, the invalid path 226 can include the traffic path 222 that does not represent a least amount of a travel cost for traveling through the junction node 204. The travel cost is defined as an intrinsic investment associated with the travel provided by a balance of a financial cost, a time impact cost, a security cost, a distance, or a combination thereof. The security cost can include a risk associated with traffic congestion, weather, an area of travel, and a population density for traveling through a geographic region. For a specific example, the travel cost can include the distance of travel, the financial cost for travel, the travel time, or a combination thereof.

An intersection type 228 is defined as a categorization of the junction node 204. For example, the intersection type 228 can include a regular intersection, a fork intersection, a merge intersection, or a combination thereof. A turn angle 230 is defined as an amount of rotation required to continue the traversal along a path. For example, the turn angle 230 for the traffic path 222 can represent 90 degrees to make a right turn. For another example, the turn angle 230 for the preferred path 208 can represent 270 degrees to make a left turn. A turn angle range 232 is defined as a range for an amount of rotation required to determine a type of the turn angle 230. For example, if the turn angle 230 is between the turn angle range 232 of 235 degrees and 315 degrees, the navigation system 100 can determine a turn type of left turn. A navigation guidance 234 is defined as notification presented by the navigation system 100. For example, the navigation guidance 234 can represent "turn right" at the junction node 204.

Figure 3:
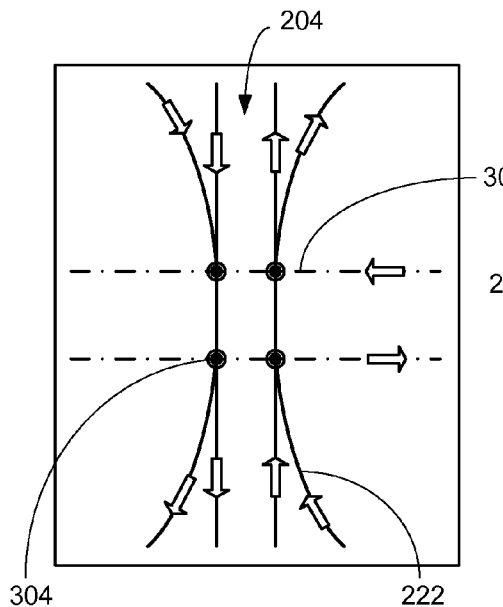
FIG. 3 is a first example of the junction node having a grade separation.

Referring now to FIG. 3, therein is shown a first example of the junction node 204 having a grade separation 302. The grade separation 302 is defined a difference in elevation between two roads that overlap each other. For example, the solid lines can illustrate a freeway having onramps and off ramps.

The road illustrated as non-solid lines can represent a local road that passes underneath the freeway. The grade separation 302 between the freeway and the local road can represent the freeway having a higher elevation than the local road. The navigation system 100 can generate the plurality of the traffic path 222 based on considering the grade separation 302. Details regarding the generation of the traffic path 222 with the grade separation 302 will be discussed later.

For further example, a fake intersection 304 is defined as a crossover by two roads which the roads are separated by the grade separation 302. More specifically, the fake intersection 304 can represent the intersection type 228 where the navigation system 100 provides no instance of the navigation guidance 234 of FIG. 2 because the navigation system 100 cannot guide a user to make a turn due to the grade separation 302.

Figure 4:
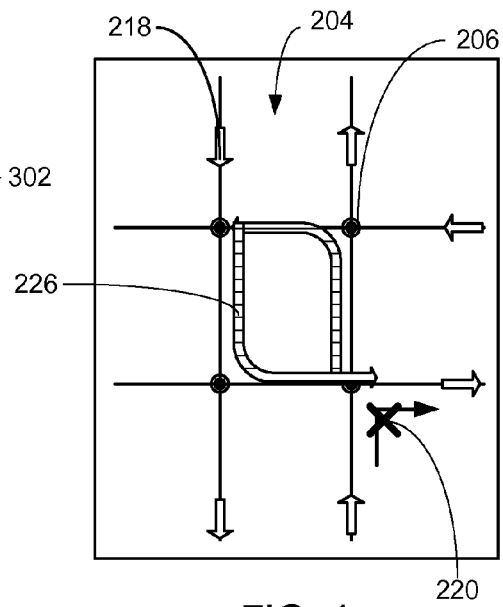
FIG. 4 is a second example of the junction node with the invalid path traveling through the junction node invalidly.

Referring now to FIG. 4, therein is shown a second example of the junction node 204 with the invalid path 226 traveling through the junction node 204 invalidly. The junction node 204 can represent the intersection of the two roads.

The roads can include lanes with each of the lane having the traffic direction 218 going in opposite direction. The junction decision points 206 can be generated at each of the intersection created from each of the lane intersecting.

The junction node 204 can include the turn restriction 220 of no right turn at one of the junction decision points 206. The invalid path 226 can be generated to travel through the junction node 204 that allows the user to make the right turn, restricted by the turn restriction 220, by traveling through each of the junction decision points 206.

However, the invalid path 226 may not reflect how the user of the first device 102 of FIG. 1 make a right turn in the real world, as the invalid path 226 travels through the junction node 204, makes two left turns within the junction node 204 at each of the junction decision points 206. The navigation system 100 can eliminate the invalid path 226 as discussed in the figure to avoid misleading the user of the first device 102. Details regarding eliminating the invalid path 226 will be discussed later.

Figure 5:
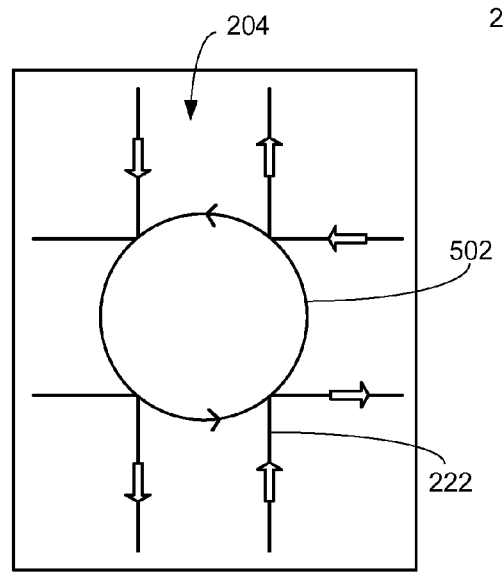
FIG. 5 is a third example of the junction node that is represented as a roundabout.

Referring now to FIG. 5, therein is shown a third example of the junction node 204 that is represented as a roundabout 502. The roundabout 502 is defined as the traffic path 222 that circles around a central divider.

For example, the roundabout 502 can include a central island guiding the traffic flow to go around the roundabout 502. The navigation system 100 can generate the traffic path 222 that represents the roundabout 502 based on merging of the internal segment 210 of FIG. 2, the external segment 214 of FIG. 2, or a combination thereof. Details regarding the generation of the roundabout 502 will be discussed later.

Figure 6:
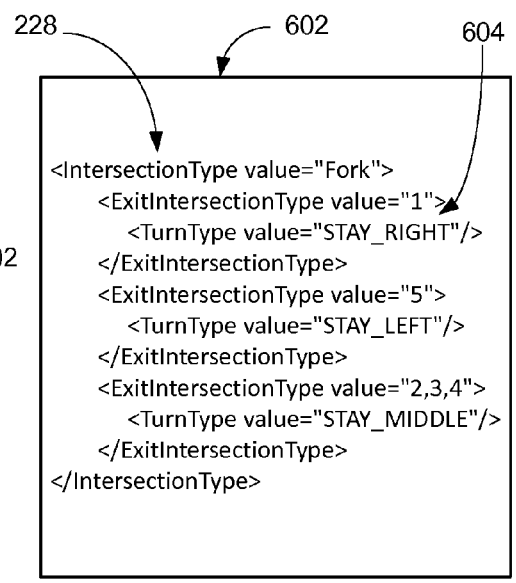
FIG. 6 is an example of a guidance definition.

Referring now to FIG. 6, therein is shown an example of a guidance definition 602. The guidance definition 602 is defined as a framework to define a guidance rule 604. For example, the guidance definition 602 can define the guidance rule 604 for when the navigation system 100 encounters the turn angle 230 of FIG. 2. For another example, the guidance definition 602 can be represented by extensible markup language (XML).

The guidance rule 604 is defined as a restriction on a movement for encountering the turn angle 230. For example, if the intersection type 228 is a fork intersection, the guidance rule 604 can represent "stay right" or "stay left" for the navigation system 100 to continue with the traversal.

Figure 7:
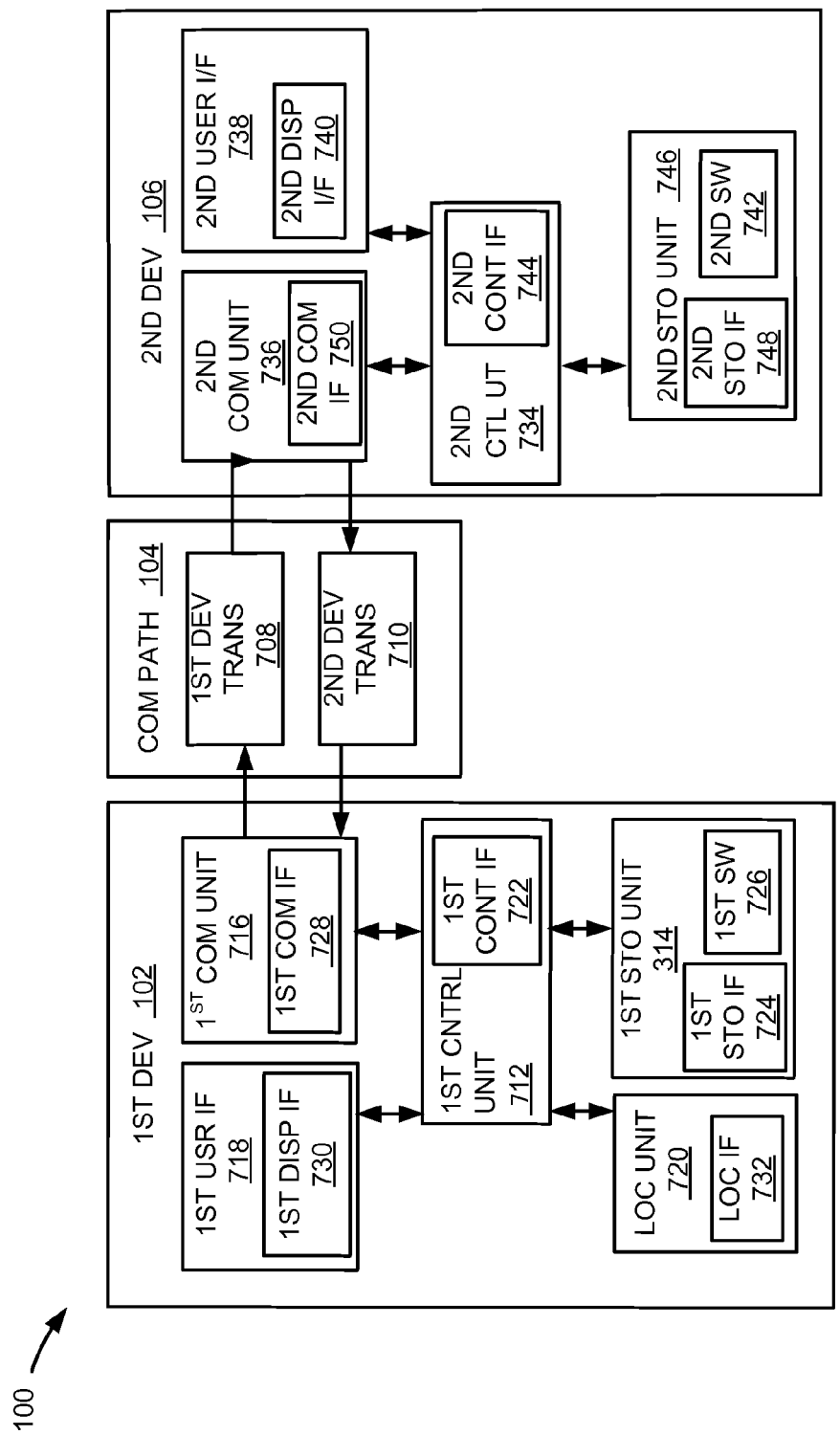
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate from the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate from the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof.

The first storage unit 714 can be a volatile memory, a nonvolatile memory, an internal memory, an external memory, or a combination thereof. For example, the first storage unit 714 can be a nonvolatile storage such as nonvolatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate from the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations physically separate from the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as nonvolatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate from the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
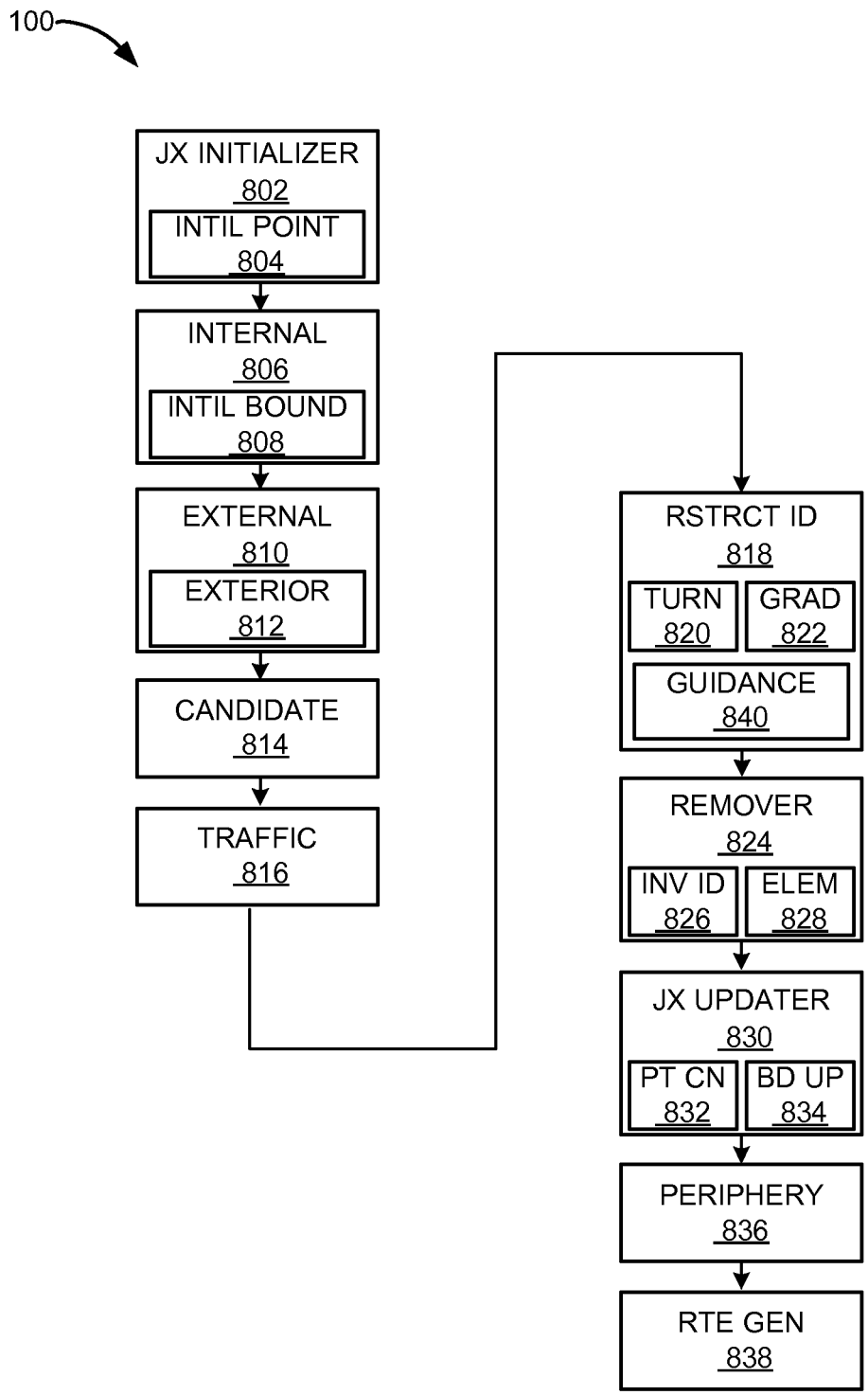
FIG. 8 is a control flow of the navigation system.

Referring now to FIG. 8, therein is shown a control flow of the navigation system 100. The navigation system 100 can include a junction initializer module 802. The junction initializer module 802 digitizes the map information representing the junction into the junction node 204 of FIG. 2. For example, the junction initializer module 802 can generate the junction node 204 having the junction decision points 206 of FIG. 2.

The junction initializer module 802 can generate the junction node 204 in a number of ways. For example, the junction initializer module 802 digitizes the map information of the road intersection. The junction initializer module 802 can obtain the map information from external sources, such as the Department of Transportation of the United States, via the first control interface 722 of FIG. 7.

More specifically, the road intersection can be the junction for roads having multiple lanes. The junction initializer module 802 can digitize each of the lanes for each of the roads as illustrated in top right figure of FIG. 2. For further example, the junction initializer module 802 can generate the junction node 204 based on digitizing each of the intersections created from each of the lanes intersecting each other.

The junction initializer module 802 can include an initial point module 804. The initial point module 804 generates the junction decision points 206 for the junction node 204. The initial point module 804 can generate the junction decision points 206 in a number of ways. For example, the initial point module 804 can generate the junction decision points 206 based on each of the intersections generated from each of the lanes of the roads intersecting each other. For another example, the initial point module 804 can generate the junction decision points 206 based on the map information of the road. More specifically, the junction decision points 206 can represent a geographic location of where the traffic controller 201 can exist on the road. For different example, the initial point module 804 can generate the junction decision points 206 based on the geographic location where the freeway onramp or the freeway off ramp connects to the freeway, as illustrated in FIG. 3.

The navigation system 100 can include an internal module 806, which can couple to the junction initializer module 802. The internal module 806 identifies the internal segment 210 of FIG. 2. For example, the internal module 806 can identify the internal segment 210 within the junction node 204, the internal segment 210 connected to one of the junction decision points 206.

The internal module 806 can identify the internal segment 210 in a number of ways. For example, the internal module 806 can identify the section of road as the internal segment 210 by identifying the section having the junction decision points 206 as the endpoints. For another example, the internal module 806 can identify the section as the internal segment 210 by identifying the section having one of the endpoints as one of the junction decision points 206. Further, the internal segment 210 can identify that the same section can also have the other end of the endpoints outside of the junction node 204.

The internal module 806 can identify the internal segment 210 by identifying the section of the freeway that connects to the freeway onramp and off ramp as illustrated in FIG. 3. For example, the initial point module 804 can identify the intersection of the freeway and the freeway onramp as one of the junction decision points 206. The internal module 806 can identify the section of the freeway extending from that one of the junction decision points 206 as the internal segment 210 that can connect to another of the junction decision points 206 to reach the freeway off ramp.

The internal module 806 can identify the road as the internal segment 210 by identifying the section of the road having the junction decision points 206 as the endpoints and is also the perimeter of the junction node 204 to establish the junction boundary 212. The internal module 806 can include an initial boundary module 808. The initial boundary module 808 establishes the junction boundary 212 of FIG. 2.

For example, the initial boundary module 808 can establish the junction boundary 212 of the junction node 204 based on the plurality of the internal segment 210 connected at the junction decision points 206. The initial boundary module 808 can establish the junction boundary 212 in a number of ways. For example, the initial boundary module 808 can establish the junction boundary 212 based on the two roads intersecting each other. More specifically, the two roads can have multiple lanes for each of the roads. The initial boundary module 808 can establish the junction boundary 212 based on an outermost lane of each of the roads intersecting each other. For specific example, the junction decision points 206 where the outermost lane of each of the roads intersect can establish the perimeter that bounds the junction node 204.

For another example, the initial boundary module 808 can establish the junction boundary 212 based on the outermost plurality of the internal segment 210. More specifically, the outermost of the internal segment 210 can represent the internal segment 210 that does not travel through the junction node 204. The plurality of the internal segment 210 that is the outermost can establish the perimeter for the junction boundary 212.

The navigation system 100 can include an external module 810, which can couple to the internal module 806. The external module 810 identifies the external segment 214 of FIG. 2. For example, the external module 810 can identify the external segment 214 outside of the junction node 204, the external segment connected to the internal segment 210 at one of the junction decision points 206.

The external module 810 can identify the external segment 214 in a number of ways. The external module 810 can include an exterior point module 812. The exterior point module 812 generates the exterior decision points 216 of FIG. 2 outside of the junction node 204.

The exterior point module 812 can generate the exterior decision points 216 in a number of ways. For example, the exterior point module 812 can generate the exterior decision points 216 based on the section of the road intersecting with another section of the road outside of the junction boundary 212. For another example, the exterior point module 812 can generate the exterior decision points 216 based on the section of a lane intersecting with another section of the lane outside of the junction boundary 212.

The external module 810 can identify the section of the road as the external segment 214 by identifying the section having one of the junction decision points 206 at the perimeter of the junction boundary 212 as one of the endpoint. Further, the road does not travel through the junction node 204 to have the other end of the endpoint to be outside of the junction node 204. For further example, the external module 810 can identify the road as the external segment 214 by identifying the section of the road, which does not travel through the junction node 204, having one of the junction decision points 206 at the perimeter of the junction boundary 212 as one of the endpoint and other one of the endpoint as one of the exterior decision points 216. For different example, the external module 810 can identify the section of the road as the external segment 214 by identifying the section having the exterior decision points 216 as the endpoints.

The navigation system 100 can include a candidate module 814, which can couple to the external module 810. The candidate module 814 generates the traffic path 222 of FIG. 2. For example, the candidate module 814 can generate the traffic path 222 through the junction node 204 based on eliminating the junction decision points 206 for merging the internal segment 210 and the external segment 214.

The candidate module 814 can generate the traffic path 222 in a number of ways. For example, the candidate module 814 can generate the traffic path 222 based on merging the internal segment 210 and the external segment 214. More specifically, the plurality of the external segment 214 can connect to the junction decision points 206. Between the junction decision points 206 that the plurality of the external segment 214 can be connected is the internal segment 210. The candidate module 814 can merge the plurality of the external segment 214 with the internal segment 210 to generate the traffic path 222. By merging, the traffic path 222 can represent a path that the navigation system 100 can travel through without requiring to make the decision on how to proceed with the travel.

For another example, the candidate module 814 can generate the traffic path 222 based on merging the plurality of the internal segment 210 within the junction node 204 for traveling through the junction node 204. The junction node 204 can include the plurality of the internal segment 210 with the junction decision points 206. The candidate module 814 can merge the plurality of the internal segment 210 to generate the traffic path 222. By merging, the junction decision points 206 can be eliminated between the plurality of the internal segment 210 in the junction node 204. Further, the traffic path 222 can represent the path that the navigation system 100 can travel through without requiring to make the decision within the junction node 204 on how to proceed with the travel.

The merging of the internal segment 210, the external segment 214, or a combination thereof can be illustrated with the following pseudo codes:

```
Merge traffic path
For each external-edge e
    if e is a middle edge of a merged traffic path
        e is a new internal edge.
For each new internal-edge e
    es are physical connected edges to e
    For each edge s in es
        If (s is not an internal-edge) and (s is not an external-edge)
            s is a new external-edge
```

For different example, the candidate module 814 can generate the traffic path 222 up to the first one of the exterior decision points 216 outside of the junction node 204. More specifically, the external segment 214 can have the endpoint of one of the junction decision points 206 and the other of the endpoint as first one of the exterior decision points 216 outside of the junction node 204. The candidate module 814 can generate the traffic path 222 by merging the internal segment 210 and the external segment 214 having the endpoint of first one of the exterior decision points 216 outside of the junction node 204.

For further example, the candidate module 814 can change the exterior decision points 216 considered for generating the traffic path 222. For example, the candidate module 814 can generate the traffic path 222 up to tenth one of the exterior decision points 216 for merging the internal segment 210 to the plurality of the external segment 214. For another example, the candidate module 814 can generate the plurality of the traffic path 222 that travels through the junction node 204.

For different example, the candidate module 814 can generate the traffic path 222 based on the geographic location of the exterior decision points 216. More specifically, the candidate module 814 can consider a distance of the exterior decision points 216 away from the junction boundary 212. For example, the candidate module 814 can consider the external segment 214 having the endpoint of one of the exterior decision points 216 that is within 100 meters away from the junction boundary 212. In contrast, the candidate module 814 can exclude the external segment 214 having the endpoint of one of the exterior decision points 216 that is beyond 100 meters away from the junction boundary 212.

For further example, the candidate module 814 can generate the plurality of the traffic path 222 having the distance of the exterior decision points 216 different from one another. More specifically, the candidate module 814 can generate the traffic path 222 having one of the exterior decision points 216 that is 85 meters away. The candidate module 814 can also generate another of the traffic path 222 having another of the exterior decision points 216 that is 150 meters away.

The identification of the exterior decision points 216 to be considered can be illustrated with the following pseudo code:

```
For (int j=0; j<ExternalEdge.size( ); j++)
    e = ExternalEdge[j];
        while ( dist(e,junction node) < length_threshold ) // Distance threshold
            ExtendedPath[j].push_back(e);
            JunctionNetwork.GetNextLink(e, links); // Consider one way but
            no restriction
            If (links.size( ) == 1) // means there is no branch.
                e = links[0];
            Else
                Break;
```

It has been discovered that the present invention reduces the computation burden by the navigation system 100 by reducing the number of the junction decision points 206 that the navigation system 100 can consider to travel through the junction node 204. The generation of the traffic path 222 eliminates the junction decision points 206 that the navigation system 100 can consider. As a result, the navigation system 100 can consider just the traffic path 222 to determine which path that the user of the first device 102 can take to travel through rather than considering each of the junction decision points 206. Thus, based on the reduction of computation burden, the navigation system 100 can reallocate the computation resource to generate accurate navigation information more efficiently for the safe operation of the navigation system 100 or the vehicle.

The navigation system 100 can include a traffic module 816, which can couple to the candidate module 814. The traffic module 816 identifies the traffic direction 218 of FIG. 2. For example, the traffic module 816 can identify the traffic direction 218, the intersection type 228 of FIG. 2, or a combination thereof of the traffic path 222.

The traffic module 816 can identify the traffic direction 218 in a number of ways. For example, the traffic module 816 can identify the traffic direction 218 for the internal segment 210, the external segment 214 or a combination thereof. More specifically, the traffic module 816 can obtain the traffic direction 218 by obtaining the map information for the internal segment 210 and the external segment 214 from external sources, such as the Department of Transportation of the United States, via the first control interface 722.

For another example, the traffic module 816 can categorize the intersection type 228 based on the traffic path 222, the traffic direction 218, or a combination thereof. More specifically, the traffic module 816 can categorize the intersection type 228 of the junction node 204 based on the turn angle 230 of FIG. 2 of the traffic path 222 traversing through the junction node 204. For example, the traffic path 222 can have 0 degree, 90 degrees, 270 degrees, or a combination thereof for the turn angle 230 within the junction ode 204. Additionally, the traffic path 222 can have the turn angle 230 representing 30 degrees, 150 degrees, 210 degrees, 330 degrees, or a combination thereof to represent a U-turn. Furthermore, the traffic module 816 can categorize the intersection type 228 based on the traffic direction 218 for the traffic path 222 to support that the traffic path 222 does indeed have the traffic direction 218 flowing at the turn angle 230.

For a specific example, the traffic module 816 can categorize the intersection type 228 as a regular intersection based on a plurality of the traffic path 222 traversing through the junction node 204 with the turn angle 230 of 0 degree, 90 degrees, 270 degrees, or a combination thereof. In addition, the traffic module 816 can identify the regular intersection based on having a plurality of the turn angle 230 for U-turn along with the turn angle 230 of 0 degree, 90 degrees, 270 degrees, or a combination thereof.

For a different example, the traffic module 816 can categorize the intersection type 228 as a fork intersection based on the traffic path 222 splitting into two instances of the traffic path 222 at one instance of the junction decision points 206. For another example, the traffic module 816 can categorize the intersection type 228 as an on ramp or an off ramp based on a plurality of the traffic path 222 merging into one instance of the traffic path 222 or splitting off into multiple instances of the traffic path 222. Moreover, the traffic module 816 can categorize the intersection type 228 of the on ramp or the off ramp based on the traffic direction 218 of how the instances of the traffic path 222 merges or splits off. As an example, if the merging of the instances of the traffic path 222 and the traffic direction 218 comes from the right to left, the traffic module 816 can categorize the intersection type 228 as the on ramp. If the splitting off of the traffic path 222 and the traffic direction 218 comes from the left to right, the traffic module 816 can categorize the intersection type 228 as the off ramp.

For illustrative purposes, the navigation system 100 is shown with the candidate module 814 generating the traffic path 222 traveling through the junction node 204, although it is understood that the candidate module 814 can operate differently. For example, the candidate module 814 can generate the traffic path 222 representing the roundabout 502 of FIG. 5.

The junction node 204 can include multiple numbers of the junction decision points 206 from intersecting with each lane of the road. Further, the roundabout 502 can include the plurality of the internal segment 210 connected to each other at each of the junction decision points 206. The candidate module 814 can determine whether the road is the roundabout 502 based on the map information obtained from the external sources via the first control interface 722. More specifically, the map information can include the traffic direction 218 as one way that guides the user of the first device 102 to travel around the center island in the middle of the junction node 204. The candidate module 814 can merge the plurality of the internal segment 210 to generate the roundabout 502 to circle around the center island.

For illustrative purposes, the navigation system 100 is shown with the traffic module 816 categorizing the intersection type 228 as the regular intersection, the fork intersection, the merge intersection, or a combination thereof, although it is understood the traffic module 816 can operate differently. For example, the traffic module 816 can categorize the intersection type 228 as the roundabout 502. As discussed above, the traffic path 222 can have the traffic direction 218 circling the center island. The traffic module 816 can categorize the intersection type 228 as the roundabout 502 based on the traffic path 222, the traffic direction 218, or a combination thereof.

The navigation system 100 can include a restriction identifier module 818, which can couple to the traffic module 816. The restriction identifier module 818 determines the turn restriction 220 of FIG. 2 and the grade separation 302 of FIG. 3. For example, the restriction identifier module 818 can determine the turn restriction 220 for identifying the traffic path 222 in violation of the turn restriction 220 for traveling through the junction node 204.

The restriction identifier module 818 can include a turn module 820. The turn module 820 can determine the turn restriction 220 on the traffic path 222. For example, the turn module 820 can determine the turn restriction 220 for the internal segment 210, the external segment 214, or a combination thereof. For specific example, the turn module 820 can obtain the map information for the turn restriction 220 from external sources, such as the Department of Transportation of the United States, via the first control interface 722. Based on the map information, the turn module 820 can determine that the internal segment 210 can have the turn restriction 220 of no right turn.

The restriction identifier module 818 can include a gradation module 822. The gradation module 822 determines the grade separation 302 of the routes traveling through the junction node 204. For example, the gradation module 822 can determine the grade separation 302 within the junction node 204 between the plurality of the traffic path 222 for traveling through the junction node 204.

The gradation module 822 can determine the grade separation 302 in a number of ways. For example, the gradation module 822 can determine the grade separation 302 amongst the plurality of the traffic path 222 by determining the grade separation 302 of the internal segment 210, the external segment 214, or a combination thereof. For specific example, as illustrated in FIG. 3, one of the junction decision points 206 can be generated based on connecting the internal segment 210 representing the freeway and another of the internal segment 210 representing the local road. The gradation module 822 can obtain the map information from the external sources via the first control interface 722 to determine that the local road travels under the freeway. The gradation module 822 can determine that the traffic path 222 that merged the freeway and the local road can have the grade separation 302 between the freeway and the local road. More specifically, the internal segment 210 representing the freeway can have a higher elevation than another of the internal segment 210 representing the local road.

For another example, the plurality of the traffic path 222 can crossover each other within the junction node 204. The gradation module 822 can determine the grade separation 302 for each of the plurality of the internal segment 210 crossing over each other.

The restriction identifier module 818 can include a guidance module 840. The guidance module 840 determines the guidance rule 604 of FIG. 6. For example, the guidance module 840 can determine the guidance rule 604 based on the intersection type 228. For further example, the guidance module 840 can determine the guidance rule 604 based on the guidance definition 602 of FIG. 6.

The guidance module 840 can determine the guidance rule 604 in a number of ways. For example, the guidance module 840 can determine the guidance rule 604 based on the intersection type 228 with the turn angle 230. As discussed above, the intersection type 228 can represent a regular intersection. The regular intersection can have a plurality of the traffic path 222 with multiple instances of the turn angle 230 for each instances of the traffic path 222. The guidance module 840 can determine the guidance rule 604 for each instances of the turn angle 230.

For example, the turn angle 230 for the traffic path 222 can be within the turn angle range 232 of FIG. 2. The guidance module 840 can generate the guidance rule 604 for the turn angle 230 within the turn angle range 232. More specifically, if the turn angle 230 falls within the turn angle range 232 of 45 degrees to 125 degrees, the guidance module 840 can determine the guidance rule 604 to represent "turn right." In contrast, if the turn angle 230 falls within the turn angle range 232 of 235 degrees to 315 degrees, the guidance module 840 can determine the guidance rule 604 to represent "turn left."

For clarification, the direction that the navigation system 100 is heading straight towards is considered 0 degree or 360 degrees and heading backwards will be 180 degrees. And the subsequent movement after heading straight will be considered turning by the user with the navigation system 100. For a specific example, if the turn angle 230 falls within the turn angle range 232 of 0 degree to 15 degrees, the guidance module 840 can determine the guidance rule 604 to represent "continue with your path" to continue with the traversal of heading straight.

For further example, if the turn angle 230 falls within the turn angle range 232 of 15 degrees to 45 degrees, the guidance module 840 can determine the guidance rule 604 to represent "turn slight right." In contrast, if the turn angle 230 falls within the turn angle range 232 of 315 degrees to 345 degrees, the guidance module 840 can determine the guidance rule 604 to represent "turn slight left." As another example, if the turn angle 230 falls within the turn angle range 232 of 160 degrees to 200 degrees, the guidance module 840 can determine the guidance rule 604 to represent "U-turn."

For another example, the guidance module 840 can determine the guidance rule 604 based on the guidance definition 602 for the intersection type 228. The intersection type 228 can represent a fork intersection. In this case, the traffic path 222 can split into two instances of the traffic path at an instance of the junction decision points 206. The guidance definition 602 can define the guidance rule 604 for the fork intersection. More specifically, the guidance definition 602 can define the left instance of the traffic path 222 after the split with the value of 5 while the right instance of the traffic path 222 after the split with the value of 1. Moreover, the guidance definition 602 can include the guidance rule 604 to represent "stay right" for the value of 1 and "stay left" for the value of 5. If there are three instances traffic path 222 between the two instances of the traffic path 222 that split off, the guidance definition 602 can define the middle three instances with the value of 2, 3, and 4 with the guidance rule 604 of "stay middle." As a result, the guidance module 840 can determine the guidance rule 604 based on the guidance definition 602.

For illustrative purposes, the navigation system 100 is shown with the traffic module 816 categorizing the intersection type 228 as the regular intersection, the fork intersection, the merge intersection, the roundabout intersection or a combination thereof, although it is understood the traffic module 816 can operate differently. For example, the traffic module 816 can categorize the intersection type 228 as the fake intersection 304 of FIG. 3. As discussed above, the grade separation 302 can indicate that a plurality of the traffic path 222 crossing over each other. Based on the grade separation 302, the traffic module 816 can identify whether the intersection type 228 is the fake intersection 304 or not. If there is no instance of the grade separation 302, the traffic module 816 can categorize the intersection type 228 to represent the regular intersection, as an example. If there is the grade separation 302, the traffic module 816 can categorize that even though multiple instances of the traffic path 222 crossover each other, the intersection type 228 can represent the fake intersection 304.

The navigation system 100 can include a remover module 824, which can couple to the restriction identifier module 818. The remover module 824 eliminates the invalid path 226 of FIG. 2. For example, the remover module 824 can eliminate the invalid path 226 based on identifying the traffic path 222 in violation of the turn restriction 220 for traveling through the junction node 204.

The remover module 824 can eliminate the invalid path 226 in a number of ways. The remover module 824 can include an invalid identifier module 826. The invalid identifier module 826 identifies the invalid path 226 based on the traffic path 222.

The invalid identifier module 826 can identify the invalid path 226 in a number of ways. For example, the invalid identifier module 826 can identify the invalid path 226 based on the traffic path 222 in violation of the turn restriction 220 for traveling through the junction node 204. The traffic path 222 can include the following combination of the sections of the road: the external segment 214, the internal segment 210, the internal segment 210, and the external segment 214. The connection between the internal segment 210 and another of the internal segment 210 can be an invalid right turn based on the turn restriction 220 of no right turn. The traffic path 222 having this combination of the plurality for the internal segment 210 can be in violation of the turn restriction 220. The invalid path 226 can identify the traffic path 222 as the invalid path 226.

For another example, the invalid identifier module 826 can identify the invalid path 226 based on the traffic path 222 that merged the internal segment 210, the external segment 214, or a combination thereof having the grade separation 302. For example, one of the internal segment 210 can crossover another of the internal segment 210, because one of the internal segment 210 can have a higher elevation than another. The initial point module 804 can generate one of the junction decision points 206 at a point where one of the internal segment 210 crossovers another of the internal segment 210.

Continuing with the example, the candidate module 814 can generate the traffic path 222 that merges one of the internal segment 210 that crossovers another of the internal segment 210. The gradation module 822 can determine the grade separation 302 between the internal segment 210 and another of the internal segment 210. Based on the grade separation 302, the invalid identifier module 826 can identify that the traffic path 222 is the invalid path 226 based on the grade separation 302 between one of the internal segment 210 and another of the internal segment 210. More specifically, two of the internal segment 210 should not have been merged because the grade separation 302 between two of the internal segment 210 inhibits user of the first device 102 to travel the traffic path 222 with the grade separation 302.

For different example, the invalid identifier module 826 can identify the invalid path 226 based on the travel cost. As discussed above, the candidate module 814 can generate the plurality of the traffic path 222. More specifically, the candidate module 814 can generate the plurality of the traffic path 222 starting from same one of the junction decision points 206 and ending at another of the same one of the junction decision points 206. Each of the plurality of the traffic path 222 can travel through other multiple of the junction decision points 206 prior to reaching the same one of the junction decision points 206. The invalid identifier module 826 can determine the travel cost for traveling along each of the plurality of the traffic path 222 to reach the same one of the junction decision points 206.

For example, as discussed above, the travel cost can include the distance of travel, the financial cost for travel, the travel time, or a combination thereof. The invalid identifier module 826 can identify the invalid path 226 based on the traffic path 222 having the travel cost higher than another of the traffic path 222. For different example, the invalid identifier module 826 can identify the invalid path 226 based on the traffic path 222 having the most number of the junction decision points 206 prior to reaching the same one of the junction decision points 206 as the endpoint.

For another example, the invalid identifier module 826 can identify the invalid path 226 based on the traffic path 222 that merged the internal segment 210, the external segment 214, or a combination thereof with a road type that could not be merged. As discussed previously, the internal segment 210 representing the freeway cannot directly connect to the internal segment 210 representing the local road without the freeway onramp or the freeway off ramp. If the candidate module 814 merged the freeway and the local road without the freeway onramp or the freeway off ramp, the invalid identifier module 826 can identify the traffic path 222 as the invalid path 226.

The remover module 824 can include an eliminator module 828. The eliminator module 828 eliminates the invalid path 226. For example, the eliminator module 828 can eliminate the invalid path 226 based on the traffic path 222 having the grade separation 302 between the internal segment 210 and the external segment 214.

It has been discovered that the elimination of the invalid path 226 improves the safe operation of the navigation system 100. The elimination of the invalid path 226 corrects data defect from merging the internal segment 210, the external segment 214, or a combination thereof that should not have been merged. Further, the elimination of the invalid path 226 reduces the computation burden that the navigation system 100 could have incurred for considering the traffic path 222 that is unnecessary. Thus, eliminating the invalid path 226 improves the safe operation of the navigation system 100 by allowing the navigation system 100 to consider the traffic path 222 more accurately and efficiently.

The navigation system 100 can include a junction updater module 830, which can couple to the remover module 824. The junction updater module 830 updates the junction node 204. For example, the junction updater module 830 can update the junction node 204 based on eliminating the junction decision points 206 by merging the internal segment 210 and the external segment 214.

The junction updater module 830 can update the junction node 204 in a number of ways. For example, the junction updater module 830 can update the junction node 204 with the traffic path 222. More specifically, the junction node 204 that has been updated can have the reduced number of the junction decision points 206, as the merging of the internal segment 210 and the external segment 214 had eliminated the junction decision points 206.

The junction updater module 830 can include a point converter module 832. The point converter module 832 converts the exterior decision points 216 into the junction decision points 206. For example, the point converter module 832 can convert one of the exterior decision points 216 that represented as the endpoint for the external segment 214 into one of the junction decision points 206. More specifically, after the external segment 214 is merged to become a part of the traffic path 222, the endpoint for the external segment 214 that was one of the exterior decision points 216 can convert into one of the junction decision points 206.

The junction updater module 830 can include a boundary updater module 834. The boundary updater module 834 updates the junction boundary 212. For example, the boundary updater module 834 can update the junction boundary 212 based on converting the exterior decision points 216 into the junction decision points 206.

For specific example, the boundary updater module 834 can update the junction boundary 212 based on the junction decision points 206 that have been converted from the exterior decision points 216. More specifically, the junction decision points 206 that have been converted become the endpoints for the traffic path 222. The boundary updater module 834 can update the junction boundary 212 based on the plurality of the traffic path 222 intersecting each other. The boundary updater module 834 can update the junction boundary 212 based on an outermost of the plurality of the traffic path 222 intersecting each other. As discussed above, the junction decision points 206 that have been converted from the exterior decision points 216 can establish the perimeter that bounds the junction node 204 that has been updated.

The navigation system 100 can include a periphery module 836, which can couple to the junction updater module 830. The periphery module 836 identifies the peripheral segment 224 of FIG. 2. For example, the periphery module 836 can identify the peripheral segment 224 connected to the traffic path 222 at the junction decision points 206 that have been converted from the exterior decision points 216. For further example, the peripheral segment 224 can extend the traffic path 222 by connecting the traffic path 222 with the peripheral segment 224.

The periphery module 836 can identify the peripheral segment 224 in a number of ways. For example, the periphery module 836 can identify the first of the external segment 214 connected to the traffic path 222 as the peripheral segment 224. For another example, the periphery module 836 can identify the external segment 214 having the first of the exterior decision points 216 outside of the junction node 204 that has been updated as the peripheral segment 224. For different example, the periphery module 836 can identify the peripheral segment 224 as the section of the road having one of the exterior decision points 216 that is beyond 100 meters from the junction boundary 212 that has been updated. The identification of the exterior decision points 216 to be considered can be illustrated with the following pseudo code as discussed above.

The extension of the traffic path 222 with the peripheral segment 224 can be illustrated with the following pseudo code:

```
For (int i =0; i<ExtendedPath.size( ); ++i)
    For (int j =i+1; j<ExtendedPath.size( ); ++j)
        If (∅ ≠ ExtendedPath[i] ∩ ExtendedPath[j])
            ExtendedPath[j].rootEdge = max (rootEdge, min(ExtendedPath[i] ∩ ExtendedPath[j]))
                ExtendedPath[j] = ExtendedPath[i] ∪ ExtendedPath[j]
                ExtendedPath[i]merged = true;
```

The navigation system 100 can include a route generator module 838, which can couple to the periphery module 836. The route generator module 838 generates the preferred path 208 of FIG. 2. For example, the route generator module 838 can generate the preferred path 208 through the junction node 204 updated for displaying on the first device 102.

The route generator module 838 can generate the preferred path 208 as discussed above. For example, the invalid identifier module 826 can identify the invalid path 226 based on the traffic path 222 having the travel cost higher than another of the traffic path 222. The route generator module 838 can generate the preferred path 208 based on the traffic path 222 having the least amount of the travel cost. For further example, the route generator module 838 can generate the preferred path 208 based on eliminating the invalid path 226 for traveling through the junction node 204.

For another example, the route generator module 838 can generate the navigation guidance 234 of FIG. 2 based on the guidance rule 604 for traversing through the junction node 204. For example, if the preferred path 208 has the turn angle 230 of 90 degrees, the route generator module 838 can generate the navigation guidance 234 representing "turn right" to be presented on the first device 102 of FIG. 1.

For further example, the route generator module 838 can share the guidance definition 602 to other users of the navigation system 100. More specifically, the route generator module 838 can share the guidance definition 602 via the first control interface 722 of FIG. 7.

It has been discovered that the present invention reduces the computation burden by the navigation system 100 for determining the preferred path 208 for traveling through the junction node 204. By eliminating the junction decision points 206 based on merging the internal segment 210, the external segment 214, or a combination thereof, the reduction of the junction decision points 206 to be considered by the navigation system 100 can alleviate computation burden and improve computation performance. Thus, the junction node 204 having reduced number of the junction decision points 206 improves the safe operation of the navigation system 100 by allowing the navigation system 100 to generate the preferred path 208 more accurately and efficiently.

The physical transformation from traveling along the preferred path 208 through the junction node 204 to reach another of the junction node 204 results in movement in the physical world, such as people using the first device 102, the vehicle, or a combination thereof, based on the operation of the navigation system 100. As the movement in the physical world occurs, the movement itself creates additional information that is converted back into the junction node 204, the junction decision points 206, the exterior decision points 216, the traffic path 222, or a combination thereof for the continued operation of the navigation system 100 and to continue the movement in the physical world.

The first software 726 of FIG. 7 of the first device 102 of FIG. 7 can include the navigation system 100. For example, the first software 726 can include the junction initializer module 802, the internal module 806, the external module 810, the candidate module 814, the periphery module 836, the traffic module 816, the restriction identifier module 818, the remover module 824, the junction updater module 830, and the route generator module 838.

The first control unit 712 of FIG. 7 can execute the first software 726 for the junction initializer module 802 to generate the junction node 204. The first control unit 712 can execute the first software 726 for the internal module 806 to identify the internal segment 210.

The first control unit 712 can execute the first software 726 for the external module 810 to identify the external segment 214. The first control unit 712 can execute the first software 726 for the candidate module 814 to generate the traffic path 222. The first control unit 712 can execute the first software 726 for the periphery module 836 to identify the peripheral segment 224.

The first control unit 712 can execute the first software 726 for the traffic module 816 to identify the traffic direction 218. The first control unit 712 can execute the first software 726 for the restriction identifier module 818 to determine the turn restriction 220. The first control unit 712 can execute the first software 726 for the remover module 824 to eliminate the invalid path 226.

The first control unit 712 can execute the first software 726 for the junction updater module 830 to update the junction node 204. The first control unit 712 can execute the first software 726 for the route generator module 838 to generate the preferred path 208.

The second software 742 of FIG. 7 of the second device 106 of FIG. 7 can include the navigation system 100. For example, the second software 742 can include the junction initializer module 802, the internal module 806, the external module 810, the candidate module 814, the periphery module 836, the traffic module 816, the restriction identifier module 818, the remover module 824, the junction updater module 830, and the route generator module 838.

The second control unit 734 of FIG. 7 can execute the second software 742 for the junction initializer module 802 to generate the junction node 204. The second control unit 734 can execute the second software 742 for the internal module 806 to identify the internal segment 210.

The second control unit 734 can execute the second software 742 for the external module 810 to identify the external segment 214. The second control unit 734 can execute the second software 742 for the candidate module 814 to generate the traffic path 222. The second control unit 734 can execute the second software 742 for the periphery module 836 to identify the peripheral segment 224.

The second control unit 734 can execute the second software 742 for the traffic module 816 to identify the traffic direction 218. The second control unit 734 can execute the second software 742 for the restriction identifier module 818 to determine the turn restriction 220. The second control unit 734 can execute the second software 742 for the remover module 824 to eliminate the invalid path 226.

The second control unit 734 can execute the second software 742 for the junction updater module 830 to update the junction node 204. The second control unit 734 can execute the second software 742 for the route generator module 838 to generate the preferred path 208.

The navigation system 100 can be partitioned between the first software 726 and the second software 742. For example, the second software 742 can include the junction initializer module 802, the internal module 806, the external module 810, the candidate module 814, the periphery module 836, the traffic module 816, the restriction identifier module 818, the remover module 824, and the junction updater module 830. The second control unit 734 can execute modules partitioned on the second software 742 as previously described.

The first software 726 can include the route generator module 838. Based on the size of the first storage unit 714 of FIG. 7, the first software 726 can include additional modules of the navigation system 100. The first control unit 712 can execute the modules partitioned on the first software 726 as previously described.

The first control unit 712 can operate the first communication interface 728 of FIG. 7 to communicate the junction node 204, the preferred path 208, or a combination thereof to or from the second device 106. The first control unit 712 can operate the first software 726 to operate the location unit 720 of FIG. 7. The second control unit 734 can operate the second communication interface 750 of FIG. 7 to communicate the junction node 204, the preferred path 208, or a combination thereof to or from the first device 102 through the communication path 104 of FIG. 7.

It has been discovered that the present invention provides the navigation system 100 for providing safe operation of the navigation system 100 and other user interface system within a vehicle. The safe operation is provided by delivering the junction node 204 having the junction decision points 206 eliminated for reducing the computation required to determine how the user of the first device 102 should proceed with the travel. Thus, the junction node 204 that has been updated reduces the distraction that can come from making decisions at the junction decision points 206. As a result, the junction node 204 that has been updated improves the safe operation of the navigation system 100 by eliminating a point of distraction for traveling through the junction node 204.

The navigation system 100 describes the module functions or order as an example. The modules can be partitioned differently. For example, the traffic module 816 and the restriction identifier module 818 can be combined. Each of the modules can operate individually and independently of the other modules.

Furthermore, data generated in one module can be used by another module without being directly coupled to each other. For example, the traffic module 816 can receive the traffic path 222 from the candidate module 814. Further, one module communicating to another module can represent one module sending, receiving, or a combination thereof the data generated to or from another module.

The modules described in this application can be hardware implementation or hardware accelerators in the first control unit 712 or in the second control unit 734. The modules can also be hardware implementation or hardware accelerators within the first device 102 or the second device 106 but outside of the first control unit 712 or the second control unit 734, respectively as depicted in FIG. 7. However, it is understood that the first control unit 712, the second control unit 734, or a combination thereof can collectively refer to all hardware accelerators for the modules. Furthermore, the first control unit 712, the second control unit 734, or a combination thereof can be implemented as software, hardware, or a combination thereof.

The modules described in this application can be implemented as instructions stored on a non-transitory computer readable medium to be executed by the first control unit 712, the second control unit 734, or a combination thereof. The non-transitory computer medium can include the first storage unit 714, the second storage unit 746 of FIG. 7, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

Figure 9:
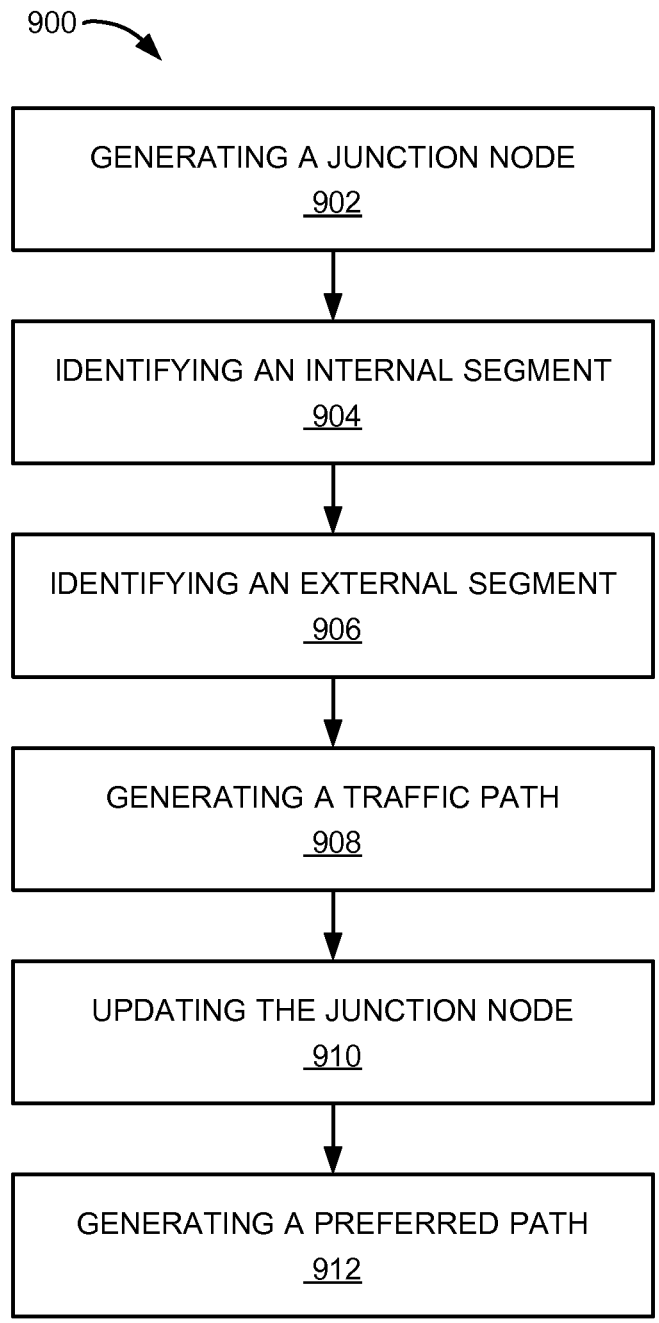
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: generating a junction node having a junction decision point in a block 902; identifying an internal segment within the junction node, the internal segment connected to the junction decision point in a block 904; identifying an external segment outside of the junction node, the external segment connected to the internal segment at the junction decision point in a block 906; generating a traffic path through the junction node based on eliminating the junction decision point for merging the internal segment and the external segment in a block 908; updating the junction node based on eliminating the traffic path in violation of a turn restriction in a block 910; and generating a preferred path through the junction node updated for displaying on a device in a block 912.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   generating a junction node having a junction decision point;
   identifying an internal segment within the junction node, the internal segment connected to the junction decision point;
   identifying an external segment outside of the junction node, the external segment connected to the internal segment at the junction decision point;
   generating a traffic path through the junction node based on eliminating the junction decision point for merging the internal segment and the external segment;
   updating the junction node based on eliminating the traffic path in violation of a turn restriction; and
   generating a preferred path with a control unit through the junction node updated for displaying on a device.

2. The method as claimed in claim 1 further comprising:
   identifying an invalid path based on identifying the traffic path in violation of the turn restriction; and
   wherein:
   generating the preferred path includes generating the preferred path based on eliminating the invalid path for traveling through the junction node.

3. The method as claimed in claim 1 further comprising determining a grade separation within the junction node between a plurality of the traffic path for traveling through the junction node.

4. The method as claimed in claim 1 further comprising determining the turn restriction for identifying the traffic path having the turn restriction for traveling through the junction node.

5. The method as claimed in claim 1 further comprising categorizing an intersection type of the junction node based on a turn angle within a turn angle range.

6. The method as claimed in claim 1 further comprising establishing a junction boundary of the junction node based on a plurality of the internal segment connected at the junction decision points.

7. The method as claimed in claim 1 wherein generating the traffic path includes merging a plurality of the internal segment within the junction node for traveling through the junction node.

8. The method as claimed in claim 1 wherein updating the junction node includes updating a junction boundary based on converting the exterior decision points into the junction decision points.

9. The method as claimed in claim 1 wherein generating the preferred path includes generating the preferred path based on the turn restriction for traveling through the junction node.

10. The method as claimed in claim 1 wherein generating the traffic path includes generating the traffic path for a roundabout for traveling within the junction node.

11. A navigation system comprising:
    a control unit for:
    generating a junction node having a junction decision point,
    identifying an internal segment within the junction node, the internal segment connected to the junction decision point,
    identifying an external segment outside of the junction node, the external segment connected to the internal segment at the junction decision point,
    generating a traffic path through the junction node based on eliminating the junction decision point for merging the internal segment and the external segment,
    updating the junction node based on eliminating the traffic path in violation of a turn restriction,
    generating a preferred path through the junction node updated, and
    a communication interface, coupled to the control unit, for communicating the preferred path for displaying on a device.

12. The system as claimed in claim 11 wherein the control unit is for:
    identifying an invalid path based on identifying the traffic path in violation of the turn restriction; and
    generating the preferred path based on eliminating the invalid path for traveling through the junction node.

13. The system as claimed in claim 11 wherein the control unit is for determining a grade separation within the junction node between a plurality of the traffic path for traveling through the junction node.

14. The system as claimed in claim 11 wherein the control unit is for determining the turn restriction for identifying the traffic path having the turn restriction for traveling through the junction node.

15. The system as claimed in claim 11 wherein the control unit is for categorizing an intersection type of the junction node based on a turn angle within a turn angle range.

16. A non-transitory computer readable medium including instructions for execution, the instructions comprising:
    generating a junction node having a junction decision point;
    identifying an internal segment within the junction node, the internal segment connected to the junction decision point;
    identifying an external segment outside of the junction node, the external segment connected to the internal segment at the junction decision point;
    generating a traffic path through the junction node based on eliminating the junction decision point for merging the internal segment and the external segment;
    updating the junction node based on eliminating the traffic path in violation of a turn restriction; and
    generating a preferred path through the junction node updated for displaying on a device.

17. The non-transitory computer readable medium as claimed in claim 16 wherein:
    identifying an invalid path based on identifying the traffic path in violation of the turn restriction; and
    generating the preferred path based on eliminating the invalid path for traveling through the junction node.

18. The non-transitory computer readable medium as claimed in claim 16 wherein determining a grade separation within the junction node between a plurality of the traffic path for traveling through the junction node.

19. The non-transitory computer readable medium as claimed in claim 16 wherein determining the turn restriction for identifying the traffic path having the turn restriction for traveling through the junction node.

20. The non-transitory computer readable medium as claimed in claim 16 wherein categorizing an intersection type of the junction node based on a turn angle within a turn angle range.

\* \* \* \* \*